(12) United States Patent
Hunter Crawley

(10) Patent No.: US 10,897,647 B1
(45) Date of Patent: Jan. 19, 2021

(54) ASCERTAINING AUDIENCE REACTIONS FOR A MEDIA ITEM

(71) Applicant: IMDB.com, Inc., Seattle, WA (US)

(72) Inventor: Jamie Russell Hunter Crawley, Bristol (GB)

(73) Assignee: IMDb.com, Inc., Seattle, WA (US)

( * ) Notice: Subject to any disclaimer, the term of this patent is extended or adjusted under 35 U.S.C. 154(b) by 0 days.

(21) Appl. No.: 16/045,239

(22) Filed: Jul. 25, 2018

(51) Int. Cl.
| | |
|---|---|
| *H04H 60/33* | (2008.01) |
| *H04N 21/442* | (2011.01) |
| *G06T 7/20* | (2017.01) |
| *G06K 9/62* | (2006.01) |
| *G06K 9/00* | (2006.01) |
| *H04N 21/44* | (2011.01) |
| *H04N 21/439* | (2011.01) |
| *H04N 21/472* | (2011.01) |

(52) U.S. Cl.
CPC ... *H04N 21/44218* (2013.01); *G06K 9/00302* (2013.01); *G06K 9/00711* (2013.01); *G06K 9/00778* (2013.01); *G06K 9/6267* (2013.01); *G06T 7/20* (2013.01); *H04N 21/4394* (2013.01); *H04N 21/44* (2013.01); *H04N 21/47217* (2013.01); *G06K 2009/00738* (2013.01); *G06T 2207/10016* (2013.01); *G06T 2207/10028* (2013.01); *G06T 2207/10048* (2013.01); *G06T 2207/30201* (2013.01); *G06T 2207/30232* (2013.01); *G06T 2207/30242* (2013.01)

(58) Field of Classification Search
CPC ......... H04N 21/44218; H04N 21/4394; H04N 21/44; H04N 21/47217
See application file for complete search history.

(56) References Cited

U.S. PATENT DOCUMENTS

| | | | | |
|---|---|---|---|---|
| 8,438,590 | B2* | 5/2013 | Crenshaw | H04H 60/33 |
| | | | | 725/10 |
| 8,553,037 | B2* | 10/2013 | Smith | G06T 13/40 |
| | | | | 345/473 |
| 8,670,018 | B2* | 3/2014 | Cunnington | G06Q 10/10 |
| | | | | 348/14.08 |
| 9,514,439 | B2* | 12/2016 | Marci | A61B 5/16 |
| 9,706,252 | B2* | 7/2017 | Hatambeiki | H04N 21/44204 |
| 10,235,562 | B2* | 3/2019 | Shaburov | G06T 7/344 |
| 2014/0276549 | A1* | 9/2014 | Osorio | A61M 5/1723 |
| | | | | 604/503 |
| 2015/0033260 | A1* | 1/2015 | Ryu | H04N 21/4722 |
| | | | | 725/40 |
| 2016/0110877 | A1* | 4/2016 | Schwartz | G06T 7/20 |
| | | | | 382/107 |
| 2017/0134803 | A1* | 5/2017 | Shaw | H04N 21/4126 |
| 2017/0169726 | A1* | 6/2017 | Aguirre | G09B 19/04 |
| 2018/0226069 | A1* | 8/2018 | Fleischman | G06Q 10/101 |

\* cited by examiner

*Primary Examiner* — Pankaj Kumar
*Assistant Examiner* — Sahar Aqil Riaz
(74) *Attorney, Agent, or Firm* — Thomas | Horstemeyer, LLP

(57) ABSTRACT

Disclosed are various embodiments for identifying and classifying audience reactions during a playback of a media item. In one embodiment, among others, a computing device is used to identify a reaction event from sensor data of a participant consuming a playback of a media item. The reaction event is correlated with a point in time of the media item. A reaction classification for the reaction event is determined based on the sensor data, and the reaction classification is associated with the point in time of the media item.

20 Claims, 6 Drawing Sheets

US 10,897,647 B1

ASCERTAINING AUDIENCE REACTIONS FOR A MEDIA ITEM

BACKGROUND

Movie watchers can have a range of emotions and reactions while watching a movie for the first time. In some cases, the reactions of the audience may not correspond with the intentions of the filmmakers during the development of a movie. Filmmakers can gauge the audience reaction from test screenings before a general release of the movie. At testing screenings, audience participants are asked to fill out a questionnaire to provide feedback for the movie.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying and classifying audience reactions during a playback of a media item. For example, media items can include movies, television shows, broadcasts, audio files, podcasts, and/or other media items. Media items are played in a variety of environments, such as movie theater auditoriums, in residential settings, in conference rooms, and other suitable media environments. In some cases, media items are experienced as part of a test group to obtain feedback. In these scenarios, the test group may be asked to participate in a questionnaire to obtain feedback on the media item before it becomes available to the general public. Generally, participants fill out questionnaires after the presentation of the media item has ended.

Figure 1:
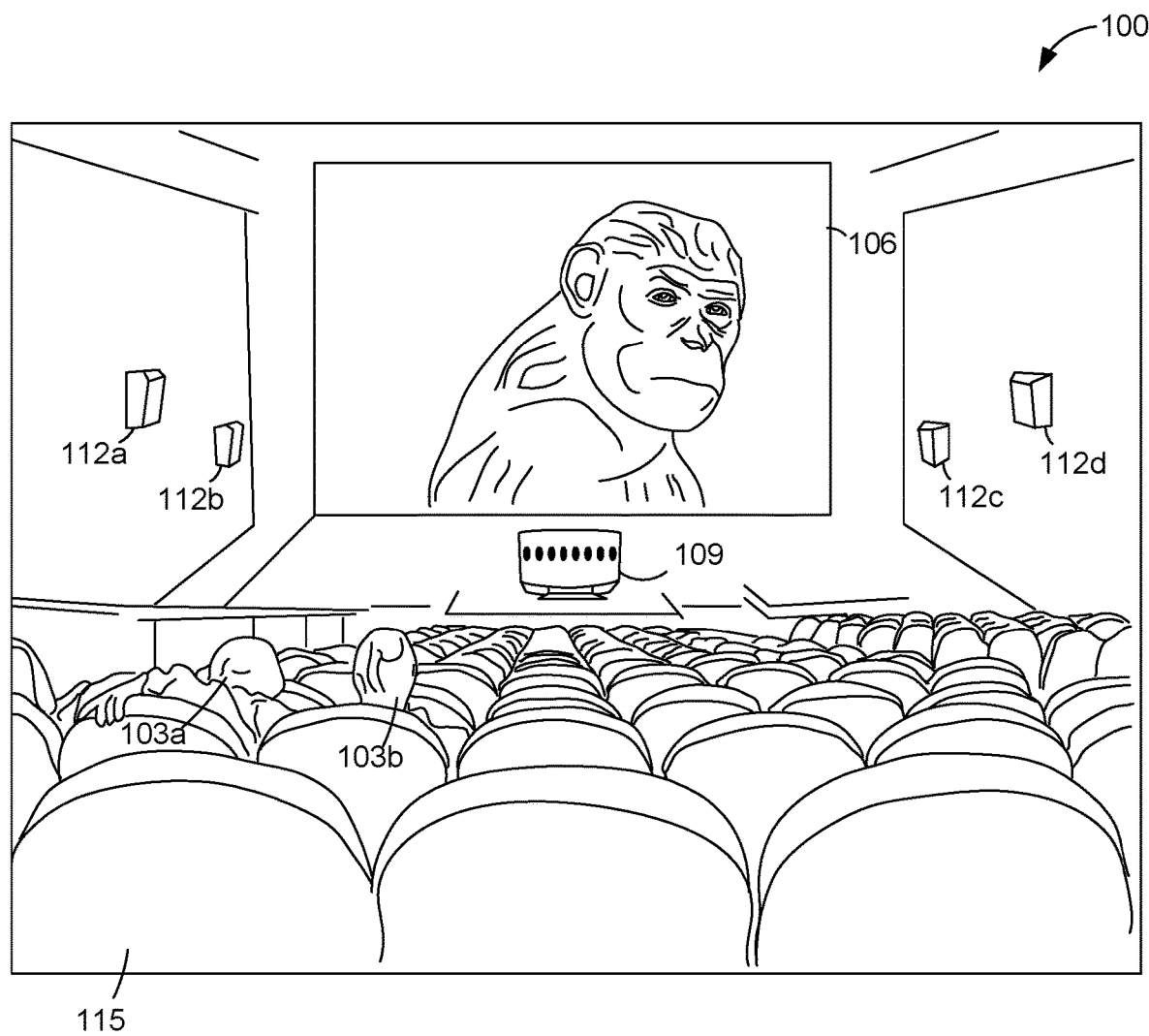
FIG. 1 is a drawing of an example media consumption environment according to various embodiments of the present disclosure.

Various embodiments of the present disclosure are directed to capturing real-time audience feedback during a playback of a media item. Participants experience a range of emotions and reactions while consuming a media item for the first time. Oftentimes, these emotions and reactions are expressed through audible sounds, facial expressions, and/or body movements. In one example embodiment, cameras and/or microphones can be positioned throughout a movie theater auditorium to capture audience reactions of consenting audience participants during playback of a movie. In this example, audience participants may consent to having their reactions captured during a test screening of a movie. The captured video and audio of the audience reacting at certain points throughout the movie can be analyzed to classify individual participant reactions or an aggregate audience reaction. In some cases, the captured video and audio can be correlated with a point in time of the movie. Then, the reaction classification can be associated with the point in time of the movie. Additionally, the embodiments can be used to capture and classify reactions for a series of movie trailers played before a feature presentation of a movie. In the following discussion, a general description of the system and its components is provided, followed by a discussion of the operation of the same Beginning with FIG. 1, a media environment 100 and its audience participants are depicted. As shown in FIG. 1, the media environment 100 is a movie theater auditorium. Audience participants 103a, 103b (collectively "participants 103") are shown watching a media item 106. As illustrated, the media environment 100 can include one or more cameras 109, a plurality of microphones 112a-d (collectively "microphones 112"), and a plurality of seats 115. Cameras 109 can be positioned throughout the media environment 100. The cameras 109 are positioned to capture video of the audience participants 103 during a playback of the media item 106, such as a movie. In FIG. 1, the camera 109 is positioned at a front of the media environment 100 and oriented toward the audience. In some cases, the cameras 109 can be positioned along the side walls and on the ceiling. The cameras 109 can be selected and configured to operate in dim or low light conditions. The cameras 109 can include an infrared camera, a point-cloud scanner, a three-dimensional scanner, and other suitable cameras. The cameras 109 can be used to capture images of facial expressions and body movement of the participants 103.

One or more microphones 112 can be positioned throughout the media environment 100. In FIG. 1, the microphones 112 are located along the side walls of the media environment 100. The microphones 112 can capture audible reactions from the audience during the playback of the media item 106. In some embodiments, the microphones 112 can capture audio recordings of the media environment 100, where the audio recordings includes audible reaction from the participants 103 with the audio from the media item 106. Subsequently, the audible reactions of the participants 103 can be determined by filtering out an audio signal from the media item 106. In other embodiments, the microphones 112 can be positioned along rows of seats 115. In another embodiment, the microphones 112 can be located in between the seats 115. In some embodiments, the microphones 112 can include beamforming microphones, omni-directional microphones, cardioid microphones, ceiling microphones, and other suitable microphones. In some scenarios, a microphone 112 can associate a set of audible reactions to a particular participant 103 based on the location of the microphone 112 in the media environment 100. For example, audio events 230 detected by a first microphone 112 in a front area of the media environment 100 can be associated with the front area location. A second microphone 112 in a back area of the media environment 100 can be associated with audio events 230 detected in the back area. In other cases, beamforming microphones can be used to associate a set of audible reaction to a particular participant 103. As one skilled in the art can appreciate, other forms of microphone technology can be used.

As shown in FIG. 1, the seats 115 are situated in the media environment 100 for the participants 103. In some embodiments, the seats 115 can include motion sensors to detect movement of the participant 103 while watching the media item 106. For example, a scary scene in the media item 106 can cause the participant 103 to jump or adjust their position within the seat. The movement of the participant 103 can be captured for a point in time of the media item 106. The motion sensors can include weight sensors, pressure sensors, and other suitable motion sensors.

Figure 2:
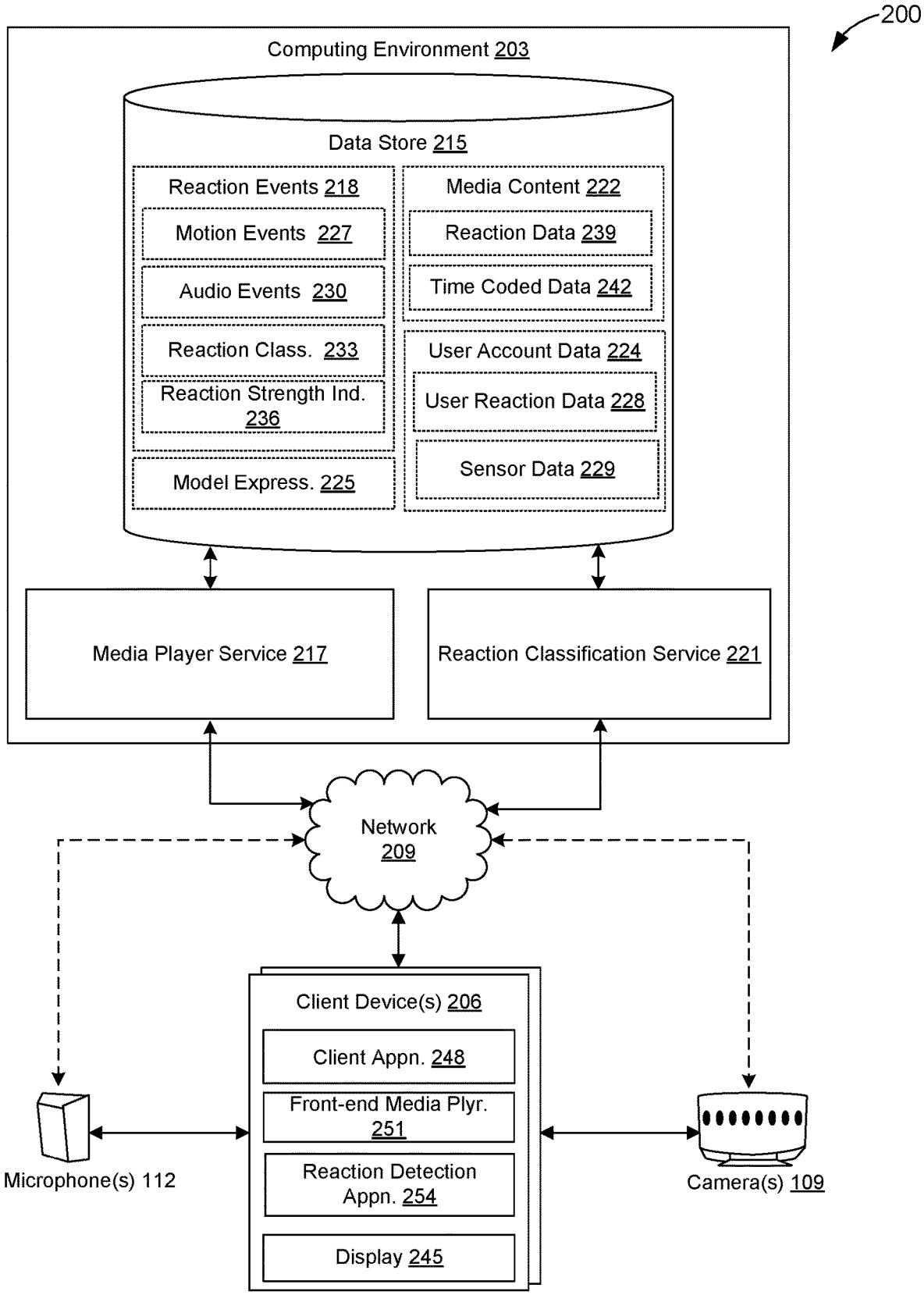
FIG. 2 is a drawing of a networked environment according to various embodiments of the present disclosure.

With reference to FIG. 2, shown is a networked environment 200 according to various embodiments. The networked environment 200 includes a computing environment 203, a client 206, cameras 109, and microphones 112, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a media player service 217, a reaction classification service 221, and other applications, services, processes, systems, engines, or functionality not discussed in detail herein. The media player service 217 is executed to transmit media items 106 for playback to one or more client devices 206. The media player service 217 can communicate with the client devices 206 over various protocols such as, for example, hypertext transfer protocol (HTTP), simple object access protocol (SOAP), real-time transport protocol (RTP), real time streaming protocol (RTSP), real time messaging protocol (RTMP), user datagram protocol (UDP), transmission control protocol (TCP), and/or other protocols for communicating data over the network 209. Additionally, the media player service 217 may generate streaming channels or transfer media items 106, such as movies, television shows, broadcasts, audio files, and/or other media content 222.

The reaction classification service 221 is executed to collect, aggregate, and correlate video and audio recordings of an audience during playback. The reaction classification service 221 can also be executed to identify visual and audible reactions from participants 103 in the video and audio data. The reaction classification service 221 can also classify the visual and audio reactions of the audience as a particular expression. For example, the reaction classification service 221 can classify visual movement reactions and/or audible reactions to include a laughing expression, a tearful expression, a frightened expression, a tense expression, an excited expression, an approving expression, and other possible human emotions.

The data stored in the data store 215 includes, for example, reaction events 218, media content 222, user data 224, model expressions 225, and potentially other data. The reaction events 218 includes various data related to video and audio data captured from the cameras 109 and microphones 112 of participants 103 viewing and/or listening to a media item 106. The reaction events 218 can include motion events 227, audio events 230, reaction classifications 233, reaction strength indicator data 236, and potentially other data. The motion events 227 include video recordings of the visual movement of one or more audience participants 103 reacting during playback of the media item 106. In some embodiments, the motion events 227 include a plurality of video segments of the one or more audience participants 103 physically reacting at different points in time of the media item 106. In other embodiments, the video segments can depict one participant from the audience reacting to the media item 106. In another embodiment, the video segments depict the reaction of the audience as a whole. The video segments can be correlated to a point in time of the media item 106 based on audio captured from the media item 106 before and/or after the occurrence of the motion event 227.

The audio events 230 include audio recordings of the audible reactions from audience participants 103 during playback of the media item 106. In some embodiments, the audio events 230 include a plurality of audio segments of one or more audience participants 103 audibly reacting at different points in time of the media item 106. In some embodiments, the audio segments can represent one participant 103 from the audience reacting to the media item 106. In other embodiments, the audio segments represent a reaction from the audience as a whole. The audio segments can be correlated to a point in time of the media item 106 based on audio captured from the media item 106 before and/or after the occurrence of the audio event 230. In some embodiments, the audio segments can be determined by filtering out an audio signal of the media item 106 from an audio recording that includes both the audio signal of the media item 106 and audible reactions from one or more audience participants 103. In other embodiments, a set of audio segments can be associated with a respective participant 103 among an audience. The audio segments can be associated with the corresponding video segments occurring at the same point in time of the media item 106.

The reaction classification 233 can include a classification of the motion event 227 and/or the audio events 230. The reaction classification 233 can represent a type of reaction that one or more audience participants 103 experienced at a point of time in the media item 106. Some non-limiting examples of reaction classifications 233 can include a laughing expression, a tearful expression, a frightened expression, a tense expression, an excited expression, and other possible human emotions. Each classification can be correlated to a point in time of the media item 106. In some embodiments, the reaction classification 233 can be determined by comparing the video segments and/or audio segments with a plurality of model expressions 225. For example, the reaction classification service 221 can identify a video segment of an audience participant 103 laughing during at particular point in the media item 106. The video segment can be compared with a plurality of model expressions 225 representative of the different possible reactions. In this example, the reaction classification service 221 can determine that the various facial and body movements of a participant 103 corresponds the closest to the laughing model expressions. In some embodiments, a set of model expressions 225 can indicate a sequence of transitions for facial reference points and body reference points representative of a particular expression. For example, frightened model expressions can indicate example transitions related to changing facial expressions and body part movements (e.g. limb movements) exhibited by a person in a frightened state. The reference points can refer to example movements for hands, arms, head, upper torso, facial expressions, and other aspects of the human anatomy that can be tracked to represent a human expression.

The reaction classification service 221 can perform an analysis of audio events 230 for classification as well. The reaction classification 233 can have a plurality of audio expression profiles representative of various human reactions. Continuing with the previous example, reaction classification service 221 can compare the audio events 230 with a plurality of audio expression profiles. The reaction classification service 233 can determine that an audio event 230 corresponds with one or more audio expression profiles representative of a laughing expression. In some embodiments, the reaction classification service 233 can classify a combination of a motion event 227 and an audio event 230 based on an expression profile that includes both audio and movement representative of a particular expression.

The reaction strength indicator 236 can include data related to an indication of a strength of a reaction from one or more participants 103. For example, the reaction classification service 221 can classify a motion event 227 and/or an audio event 230 as a frightened expression. The reaction strength indicator 236 can represent an indication of how strongly the one or more participant 103 reacted. In some embodiments, the reaction strength indicator 236 can be expressed as a numerical range, for example between one and ten. In other embodiments, the reaction strength indicator 233 can represent a reaction gauge for a particular section or a particular location in the media environment 100. For example, in the front of the movie theater auditorium, the reaction strength indicator 236 may indicate a stronger reaction then in the back of the movie theater auditorium. In this example, the reaction classification service 221 may have determined that the reaction events 218 from participants 103 in the front of the movie theater auditorium had a stronger reaction than the reaction events 218 from participants 103 in the back of the movie theater auditorium.

Additionally, in some embodiments, the reaction strength indicator 236 can be determined by a comparison of the motion events 227 and/or the audio events 230 with a plurality of model expressions 225. After the motion events 227 and/or audio event 230 has been classified, in some embodiments, another round of comparisons can be performed to determine the strength of the reaction classification 233. Each unit within a range of possible reaction strength indicator values can be represented by a set of model expressions 225. For example, the motion events 227 being analyzed can be determined to correspond the closest with a set of frightened model expressions representing a six out of ten.

The media content 222 can include movies, television shows, broadcast shows, live show recordings, audio files, podcasts, and/or other suitable media content 222. In some cases, the media content 222 can be streamed over the network 209. In other cases, the media content 222 can be transferred to the client device 206. In one embodiment, the reaction classification service 221 can be used to capture and analyze reactions to audience reactions to a live show, such as a comedy performance, a theatrical performance, a musical concert, and/or other live events. In this scenario, video may be captured of the live show to correlate with the reaction events 218. The media content 222 can include reaction data 239 and time coded data 242 associated with individual media content files. The reaction data 239 can include the various reaction classifications 233 and the corresponding reaction strength indicators 236 for individual media items 106. In some embodiments, the reaction data 239 can stored as meta data for the individual media items 106.

The time coded data 242 can represent timing information related to when the motion events 227 and audio events 230 occurred within a timeframe of the media items 106. For example, the time coded data 242 can indicate that one or more participants 103 had a laughing expression at twenty minutes and ten seconds into the media item 106. A tearful expression occurred at one hour and thirty minutes into the media item 106. In some embodiments, a threshold quantity of participants 103 within a predefined time period has to be satisfied in order for the motion events 227 and/or audio events 230 to be considered for classification. For example, motion events 227 captured from two or three participants 103 among fifty other participants 103 may not proceed for classification. Additionally, in some embodiments, a threshold reaction strength indicator threshold has to be satisfied in order for the reaction classification 233 to be logged as a reaction at a point in time of the media item 106. For instance, a set of motion events 227 from a participant 103 has a low reaction strength indicator 236. Since there was a low reaction strength indicator 236, the reaction classification 233 will not be logged as a reaction at a point in time of the media item 106.

The user account data 224 includes various data regarding user accounts managed by the media player service 217 and/or the reaction classification service 221. For example, the user account data 224 may include usernames, security credentials, theater seating information, and/or other data that may be acquired for client devices 206. The security credentials may include passwords, credit card information, client device information, and/or other data that may be employed for authentication of a participant 103 in a media environment 100.

The user account data 224 can also include user reaction data 228 and sensor data 229. The user reaction data 228 can include reaction events 218 associated with an individual participant 103 for a particular media item 106. In some embodiments, ticketing data can be provided to the reaction classification service 221. The ticketing data can be used to identify a seating location of a participant 103, which can be associated user account data 224 of the participant 103. For example, movie tickets can be purchased at a movie theater website. During the ticketing transaction, participants 103 can select their seat location in the movie theater auditorium. In some scenarios, the participant 103 may have a user account with the movie theater website. Reaction events 218 captured at the seat locations can be classified and associated with the user account of the participant 103 that purchased the tickets. In a residential setting, participants 103 can login with their username and security credentials. The reaction events 218 captured in the residential setting can be associated with the user account data 224 for the participant 103.

The sensor data 229 can include participant sensory data acquired during the playback of the media item 106. The sensor data 229 can include heart rate data, respiratory data, motion data, and/or other suitable sensory data. The sensor data 229 can be obtained from sensors associated with the seats 115, mobile devices (e.g. smartphones), wearable computing devices (e.g. smartwatches, head-mount display devices), wearable sensors, or other suitable sensing devices. The sensor data 229 can be used to determine the reaction classification 233 and/or the reaction strength indicator 236. In one example, the model expressions 225 can have sensor data models for each possible reaction classifications 233. For example, heart rate data acquired from a participant 103 can be compared to the sensor data models for each possible reaction classifications 233 in order to classify the experience of the participant 103 at a point in time of the media item 106.

The model expressions 225 can include data models representative of various emotions and expressions that can be experienced by audience participants 103. The model expressions 225 can be used to determine the reaction classification 233 and the reaction strength indicator 236. In one example, the model expressions 225 can be compared with the motion events 227 and/or audio events 230 to identify the reaction classification 233 and/or the reaction strength indicator 236. Particularly, a model expression 225 can include a combination of both visual movements and audible sounds for a particular expression. For example, a laughing model expression can include models that comprise a combination of both visual movements and audible sounds associated with a laughing expression. In some embodiments, the model expressions 225 can include video segments and/or audio segments of various variations of a particular reaction expression, such as a laughing expression, a frightened expression, an applauding expression, and/or other suitable expressions. In other embodiments, the model expressions 225 can include data describing characteristics of the various reaction expressions.

The client device 206 is representative of a plurality of client devices that may be coupled to the network 209. The client device 206 may comprise, for example, a processor-based system such as a computer system. Such a computer system may be embodied in the form of a projector, a television, a smart speaker, a desktop computer, a laptop computer, personal digital assistants, cellular telephones, smartphones, set-top boxes, music players, web pads, tablet computer systems, game consoles, electronic book readers, head mounted displays, voice interface devices, a media device, or other devices. The client device 206 may include a display 245. The display 245 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 248, front-end media player 251, a reaction detection application 254, and/or other applications. The client application 248 may be executed in a client device 206, for example, to access network content served up by the computing environment 203 and/or other servers, thereby rendering a user interface on the display 245. To this end, the client application 248 may comprise, for example, a browser, a dedicated application, etc., and the user interface may comprise a network page, an application screen, etc. The client device 206 may be configured to execute applications beyond the client application 248 such as, for example, email applications, social networking applications, word processors, spreadsheets, and/or other applications.

The front-end media player 251 can operate to control the playback of the media items 106 in the client device 206 or other devices controlled by the client device 206. In some embodiments, the front-end media player 251 presents the media items 106 as a video stream from the media player service 217. In some scenarios, the front-end media player 251 is executed in a movie theater setting. In other scenarios, the front-end media player 251 is executed in a setting where the media items 106 can be played on a television, via a projector, or through speakers, which can be arranged in an office setting or a residential setting.

The reaction detection application 254 can operate to capture reaction events 218 from participants 103 viewing and/or listening to a playback of a media item 106. In some embodiments, the reaction detection application 254 can be in data communication with the microphones 112 and the cameras 109 in order to receive video and audio recordings of the participants 103 over the network 209. In some embodiments, the microphones 112 and cameras 109 are wired directly to the client device 206.

In another embodiment, the reaction detection application 254 can identify potential reaction events 218 from the participants 103 in the media environment 100. The reaction detection application 254 can identify video segments that include the potential motion events 227 and/or identify audio segments that include potential audio events 230. The video and audio segments can be transmitted to the reaction classification service 221

Next, a general description of the operation of the various components of the networked environment 200 is provided. To begin, the reaction detection application 254 can be executed on client devices 206 that control a playback of media items 106 in a media environment 100. For example, the client devices 206 can control a movie projector in a movie theater auditorium, a television or a projector in a residential setting, and other suitable media environments 100.

In some media environments 100, audience participants 103 can be identified and associated with a seating location in the media environment 100. Participants 103 may login with a user account during a ticketing transaction. The participants 103 may select their seating location during the transaction. For example, participant John Doe may purchase two tickets located at row 4 and at seats 2 and 3. The ticketing and seating information can be acquired from a ticketing service. In some media environments 100, a participant 103 may login with their user account to purchase or rent a media item 106 in a residential setting.

In some embodiments, the reaction detection application 254 can acquire an initial seating occupancy from the cameras 109. The initial seating occupancy can include data indicating which seats are occupied and a count of the participants 103 in the media environment 100. The initial seating occupancy may also include data related to an initial viewing posture of the participant 103, such as whether the participant 103 is standing or seated. The initial viewing posture of the participant 103 can be used to determine a reaction event 218. For example, the reaction classification service 221 can identify a point in time in which a quantity of the participants 103 have changed their initial viewing posture. In this example, the change may indicate a quantity of participants 103 have left the media environment 100, which may indicate that a point in time of the media item 106 was uninteresting.

The reaction detection application 254 can receive an indication that a playback of a media item 106 is occurring in the media environment 100. The front-end media player 251 can transmit the indication to the reaction detection application 254. In other scenarios, the media player service 217 can provide the indication as the media item 106 is being streamed to the client device 206. The indication can be received from the front-end media player 251.

During playback of the media item 106, the reaction detection application 254 can receive video recordings of participants 103 reacting to particular points in time of the media item 106. In some cases, the video recordings can comprise collective visual reactions of a plurality of participants 103 in the audience. In other cases, the video recordings can comprise individual visual reactions of individual participants 103 among the group of participants 103.

The reaction detection application 254 can transmit the video recordings over the network 209 to the reaction classification service 221, which will identify the motion events 227 to determine the reaction classifications 233 associated with the motion events 227. In some embodiments, the reaction detection application 254 can identify the motion events 227 and determine the associated reaction classifications 233, rather than transmitting the recordings to another computing device.

The reaction classification service 221 can identify motion events 227 from video recordings. Participants 103 can express a range of audible emotions and have various physical reactions during the playback of the media item 106. Some expressions may occur suddenly and others may be expressed more slowly. In one embodiment, the reaction classification service 221 can identify body movements of individual participants 103. In some cases, the reaction classification service 221 detects body movements or transitions that occur over a short time span to capture sudden reactions. For example, the reaction classification service 221 can detect sudden arm movements by participants 103 within a predefined period, such as less than a second. The sudden arm movement may have occurred as a participant 103 was frightened at a point in time of a media item 106.

In other cases, the reaction classification service 221 can identify reactions that occur in a slower manner, such as tearful expressions. In some embodiments, the reaction classification service 221 can detect some reactions by identifying common patterns used in certain expressions. For example, the reaction classification service 221 can identify a hand and arm movement for wiping around the eyes of a participant 103. The identification of this sequence of movements can be used to identify that the participant 103 is expressing a tearful expression. Additionally, the reaction classification service 221 can track the movement of a plurality of points of a body of participant 103.

Further, the reaction classification service 221 can be used to detect facial movements related to reaction event 218. The facial movements can provide data points for determining which reaction the participant 103 is expressing. For instance, closing eye lids, contorting facial muscles, various positions of the mouth of a participants 103, and other detectable facial movements can be identified.

The reaction classification service 221 can also identify audio events 230 from an audio recording of the participants 103 viewing and/or listening to a playback of a media item 106. The audio recordings can be captured by microphones 112 positioned at various locations in the media environment 100. In some embodiments, the reaction classification service 221 can identify audio events 230 by filtering out an audio signal associated with the media item 106. The remaining audio can represent audible reactions from the participants 103 at different points in time of the media item 106. In other embodiments, the type of microphone 112 and its positioning within the media environment 100 can focus the audio pick up on the audible reactions of the participants 103.

In some embodiments, the motion events 227 and/or the audio events 230 can be correlated to a point in time of the media item 106. In some scenarios, the audio occurring immediately before and/or immediately after the reaction events 218 can be used to identify a point in time for the media item 106. In other embodiments, the cameras 109 and the microphones 112 can capture video and audio recordings in sync with the playback timeline of the media item 106. Video and audio segments of the motion events 227 and/or the audio events 230 can be extracted from longer video and audio files. The video and audio segments can be used for classifying the reaction occurring in the segments.

In some embodiments, the reaction classification service 221 can determine whether there is sufficient participant 103 feedback at a point in time in the media item 106. The reaction classification service 221 can determine whether a threshold quantity of participants 103 have reacted at the point in time of the media item 106. For example, the reaction classification service 221 can determine from one or more motion events 227 that three participants 103 reacted with respect to a particular point in time of a media item 106. A reaction from three participants 103 out of a hundred participants 103 in the audience may fail to exceed a reaction threshold. Thus, the motion events 227 may not be further processed for a reaction classification 233 with respect to the particular point in time of the media item 106. The reaction threshold can be based on a number of participants 103 in the media environment 100. For example, the reaction threshold may be configured to be thirty percent of the participants 103 in the media environment 100.

In some embodiments, the reaction classification service 221 can determine a reaction classification 233 of the motion events 227 from the video segments of the captured reaction. The reaction classification service 221 can determine a reaction classification 233 of the audio events 230 from the audio segments of the captured reaction. In some scenarios, a reaction classification 233 is determined based on a combination of the motion event 227 and audio events 230. In some embodiments, the reaction classification 233 can be determined based on a comparison with a plurality of model expressions 225, where each possible reaction can be associated with a subset of the model expressions 225. The model expressions 225 can include a sequence of video frames or an audio profile. For example, visual model expressions can depict different forms of possible reactions, such as being frightened, laughing, applauding, crying, and/or other suitable expressions. Additionally, the visual model expressions can depict different variations of each expressions.

The audio model expressions can include an audio profile representative of an individual expression. For example, the audio profile can include an audio profile of one or more persons applauding, laughing, screaming, gasping, sighing, making audible comments regarding the media item 106, or other suitable audible expressions. Each audible reaction can be associated with a subset of audio expressions. For instance, a plurality of audio model expressions can be used to represent the various sounds an individual makes while screaming during a movie experience.

The reaction classification service 221 can compare the motion events 227 with a plurality of visual model expressions. The comparison can involve comparing a first sequence of movements by a participant 103 in the motion event 227 with a second sequence of movements depicted in one of the visual model expressions. From the comparison, the reaction classification service 221 determine a reaction classification 233 that matches the closest to the motion events 227.

Similarly, the reaction classification service 221 can compare the audio events 230 with a plurality of audio model expressions. The comparison can involve comparing a first audio profile of the audio event 230 with a second audio profile in one of the audio model expressions. The reaction classification service 221 can determine a reaction classification 233 that corresponds the closest to the audio profile of the audio events 230 based on the comparison. In some embodiments, a combination of comparison results with the motion events 227 and the audio events 230 are used to determine the reaction classification 233.

Additionally, the reaction classification service 221 can determine a reaction strength indictor 236 associated with the reaction classification 233. The motion events 227 and the audio events 230 can also be compared with the model expressions 225 to determine how strong of a reaction occurred at the point in time of the media item 106. The different variations of the model expressions 225 can be used to represent different levels of each possible reaction. For example, the reaction classification service 221 can determine that the motion events 227 correspond the closest with a plurality of laughing model expressions that represent a seven on a scale of one to ten. In other embodiments, the reaction strengthen indicator 236 can be determined based on a total quantity of participants 103 having the same reaction or similar reaction in the media environment 100. For example, the reaction strengthen indicator 236 can be determined to be an eight out of ten based on a determination that eighty percent of the participants 103 had the same reaction at a point in time of the media item 106.

Then, the reaction classification service 221 can associate the reaction classification 233 with a point in time in the media item 106. For example, the reaction classification service 221 can determine at the fifteen minutes and twenty seconds mark of a media item 106 a laughing reaction occurred by one or more participants 103. At the forty minutes and fifteen seconds mark, the reaction classification service 221 identified a cheering reaction, and at the one hour, ten minutes, and twenty-three seconds mark of the media item 106 a tearful expression was detected.

Additionally, the embodiments can be used to identify and classify audience reactions from multiple media items 106 played in a sequence. For example, the embodiments can be used to capture and classify reactions events 218 to movie trailers in addition to a featured movie. The reaction detection application 254 can identify a first movie trailer currently be presented and associate reaction classifications 233 to points in time for the first movie trailer. A change from the first movie trailer to a second movie trailer can be identified. Subsequently, the reaction classifications 233 determined for the second movie trailer can be associated to points in time for the second movie trailer.

Further, the embodiments can cause the cameras 109 to perform a first audience scan for a first media item 106 and a second audience scan for a second media item 106. For example, cameras 109 can be used to identify a quantity of participants 103 and their locations in the media environment 100 for each media item 106. Thus, during a movie-going experience, the audience may view two movie trailers and the featured movie. The embodiments can determine the audience size and audience reactions for each movie trailer and the featured movie.

In another scenario, participants 103 may be viewing a media item 106 at their home. In this setting, the client device 206 may be a first media device, such as a television, a video projector, a display device, a computer, a tablet device, a smartphone device, or other suitable media devices. The client device 206 can be in data communication with other media devices in the home. Other media devices may include a smart speaker, an external camera, a smartphone device, a personal assistant device, and/or other suitable media devices. The other media devices can provide sensor data 229, such as video recordings and audio recordings, of the participant 103 during the playback of the media item 106.

In some embodiments, the front-end media player 251 can initiate a playback of the media item 106. The reaction detection application 254 can identify the initiation of the playback of the media item 106 and transmit a video and/or audio recording instruction to the other media devices. In some embodiments, the client device 206 can transmit the recording instructions to other media devices that are within a proximity of the client device 206. In one embodiment, the client device 206 can determine whether the other media devices are within a proximity based on whether the other media device can detect audio generated by the client device 206. In other embodiments, the client device 206 can determine that the other media devices are within a proximity of the client device 206 by detecting that the other media devices are directly connected to the client device 206.

Upon the start of playback, the reaction detection application 254 can transmit a record instruction to cause the other media devices to begin capturing video and/or audio in the media environment 100. The other media devices can transmit the video and audio recordings to the reaction classification service 221 for processing. In various situations, the participant 103 may not be actively watching and/or listening to the media item 106 at certain points, which can be noted to correlate other reaction events 218. In some embodiments, the reaction detection application 254 can determine from the video recording that the participant 103 has left a predefined viewing area. In other embodiments, the reaction detection application 254 can receive an indication from a camera 109 that one or more participants 103 have left the defined viewing area. In some cases, the reaction detection application 254 can instruct the front-end media player 251 to pause the playback of the media item 106 after determining that one or more participants 103 have left the defined viewing area. Additionally, the reaction detection application 254 can determine that the one or more participants 103 have returned to the viewing area. The reaction detection application 254 can instruct the front-end media player 251 to resume playback of the media item 106 after detecting the return of the participants 103.

In other scenarios, the reaction detection application 254 can receive other indications that one or more participants 103 are likely not watching and/or listening to the media item 106. These indications can trigger and determine a particular media player action. For example, the reaction detection application 254 can receive an indication that one or more participants 103 are engaged with a phone call on a mobile device, such as a smartphone, a tablet device, a laptop, or other suitable communication device. Specifically, the mobile device can transmit to the reaction detection application 254 an indication of an incoming phone call, an outgoing phone call, or that a phone call is currently in progress, which can instruct the front-end media player 251 to pause the playback of the media item 106. Other scenarios may involve the reaction detection application 254 receiving an indication that a door bell at a residence has been rung or an indication of a detection of the participant 103 in another area outside of the viewing area, such as the participant 103 being detected by a thermostat, an external camera, a motion security sensor, or other suitable device.

In some scenarios, the reaction detection application 254 can identify a pause or stop command received by the front-end media player 251. In turn, the reaction detection application 254 can transmit a pause recording command to the other media devices that are recording video and/or audio. Upon identifying a play command for the front-end media player 251, the reaction detection application 254 can transmit an instruction for the other media devices to begin recording audio and/or video.

In another embodiment, the other media devices can provide additional sensor data 229. For example, a smartphone device can be in data communication with the client device 206. Oftentimes, smartphone devices are placed in clothing items, such as pant pockets, or located near the participants 103. The smartphone device can be used to capture audio and/or motion data related to the participant 103 during the playback of the media item 106. The motion data can indicate movements participant 103 performed during the playback of the media item 106. In another embodiments, a wearable computing device, such as a smartwatch, a head-mounted display, and/or other suitable wearable computing devices can be in data communication with the client device 206. The wearable computing device can capture sensor data 229 such as heart rate data, movement data, and other sensory data. Specifically, the heart rate data can be used to determine a reaction classification 233. Heart rate profiles of reaction expressions can be used to determine a reaction classification 233. For example, a rising heart rate during the course of three seconds may indicate that the participant 103 is in a tense state, a frightened state, an excited state, or other suitable reaction expressions.

Figure 3:
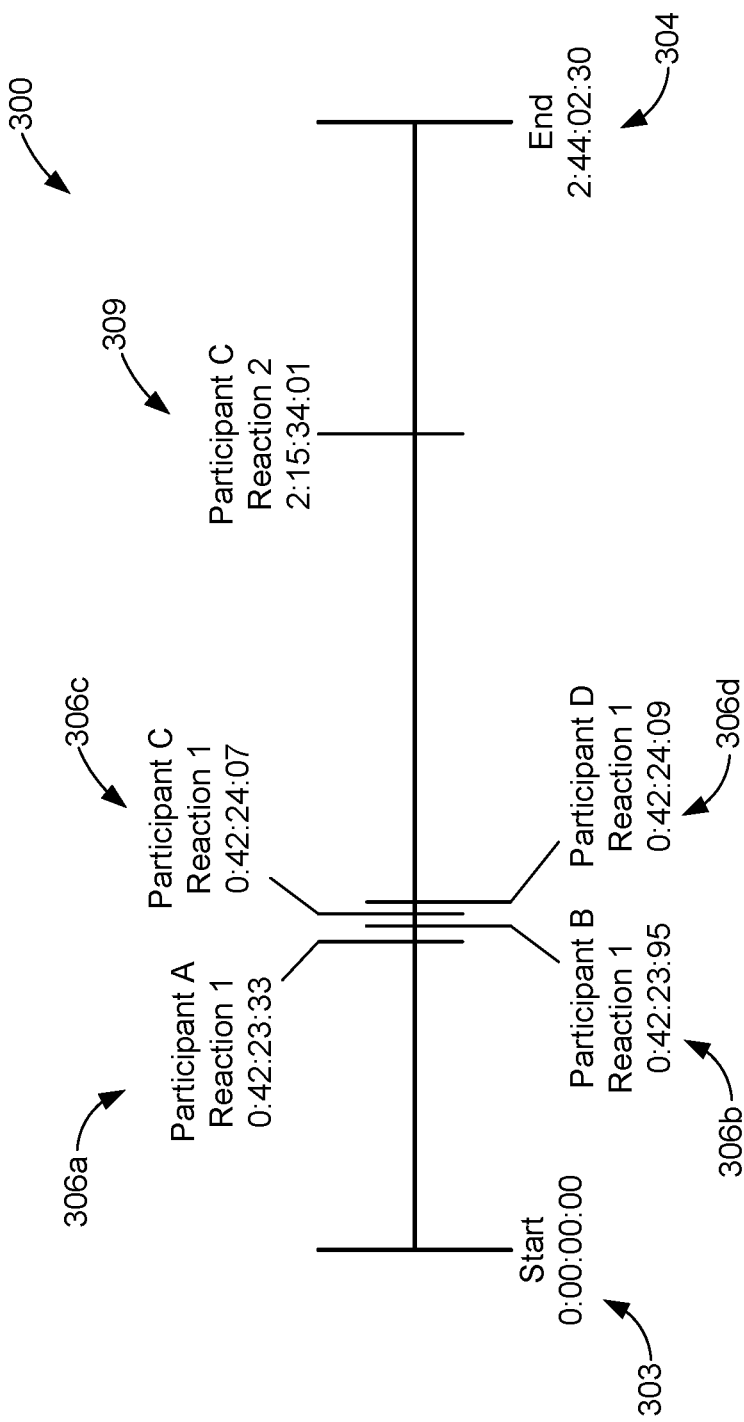
FIG. 3 is a drawing of an example timeline representative of a length of a media item according to various embodiments of the present disclosure.

Next, with regard to FIG. 3, shown is an example timeline 300 representative of a length of a media item 106. Additionally, the timeline 300 illustrates a plurality of reactions from various participants 103 viewing the media item 106. Reference 303 indicates the beginning of the media item 106 and reference 304 indicates the end of the media item 106. References 306a-306d refer to reactions captured by participants 103 A, B, C, and D. Each reaction by a participant 103 has a timestamp. As shown in FIG. 3, participants 103 A, B, C, and D each have a "Reaction 1" with a unique timestamp. Each of these reactions can refer to a motion event 227 and/or an audio event 230. The reaction classification service 221 can determine whether the four reactions constitute sufficient participant feedback to be classified as a reaction. For example, the reaction classification service 221 can determine whether the four reactions occurred within a period of time. Then, the reaction classification service 221 can determine whether the four reactions meets or exceeds a participant threshold for classifying the reaction events 218. For example, in contrast, "Reaction 2" was captured for only one participant 103 at a different point in time of the media item 106. Thus, in some examples, the reaction events 218 associated with "Reaction 1" may proceed for classification, and the reaction events 218 associated with "Reaction 2" may be disregarded since only one participant 103 had a reaction.

Figure 4:
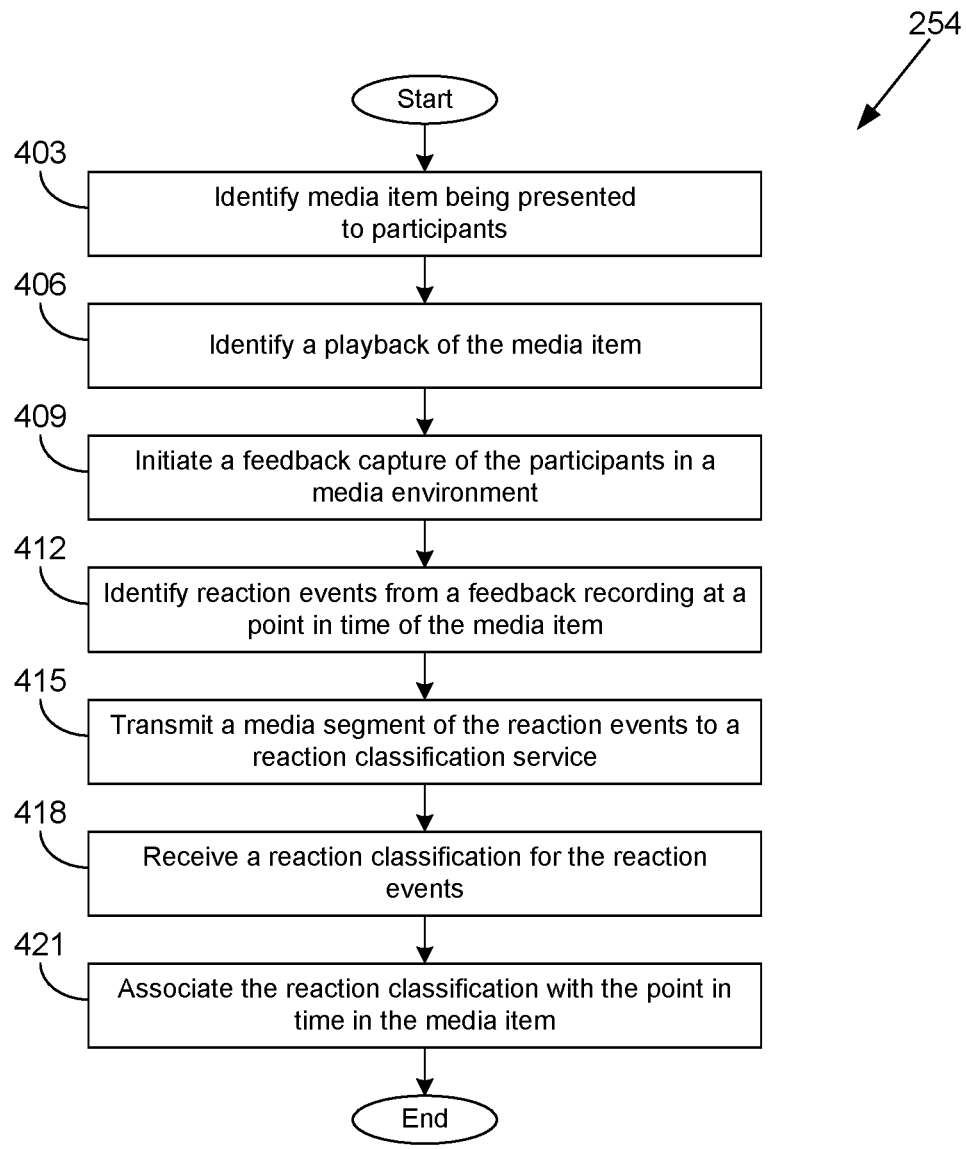
FIG. 4 is a flowchart illustrating examples of functionality implemented as portions of a reaction detection application executed in a client device in the networked environment of FIG. 2 according to various embodiments of the present disclosure.

Referring next to FIG. 4, shown is a flowchart that provides one example of the operation of a portion of the reaction detection application 254 according to various embodiments. It is understood that the flowchart of FIG. 4 provides merely an example of the many different types of functional arrangements that may be employed to implement the operation of the portion of the reaction detection application 254 as described herein. As an alternative, the flowchart of FIG. 4 may be viewed as depicting an example of elements of a method implemented in the computing environment 203 (FIG. 2) according to one or more embodiments.

Beginning with box 403, the reaction detection application 254 can identify a media item 106 being presented to participants 103 (FIG. 1) in a media environment 100. The reaction detection application 254 can receive an indication of a particular media item 106 about to be presented from the front-end media player 251 (FIG. 2) or from the media player service 217 (FIG. 2).

In box 406, the reaction detection application 254 can identify a playback of the media item 106. In some embodiments, the reaction detection application 254 can receive an indication for playback from the front-end media player 251 or from the media player service 217.

In box 409, the reaction detection application 254 can cause a feedback capture of the participants 103 to begin. In some embodiments, the reaction detection application 254 can transmit a capturing instruction to media devices with cameras 109 (FIG. 1) and/or microphones 112 (FIG. 1). For example, the reaction detection application 254 may be executed in a television operating as the client device 206. The reaction detection application 254 can cause an external or internal camera 109 to begin capturing video of the participant 103 watching a media item 106. As another example, the reaction detection application 254 can instruct a smart speaker to begin recording audio of the participant 103 during the playback of the media item 106.

In box 412, the reaction detection application 254 can identify reaction events 218 (FIG. 2) from the feedback recordings (e.g. video and audio recordings) at a point in time of the media item 106. In some embodiments, the reaction detection application 254 can identify motion events 227 (FIG. 2) and/or audio events 230 (FIG. 2) from a video recording and/or an audio recording. Upon identifying the reaction events 218, the reaction detection application 254 can extract the reaction events 218 from the video recordings and/or the audio recordings in order to generate video and audio segments of the reaction events 218. Additionally, the reaction detection application 254 can also correlate the reaction events 218 to a point in time of the media item 106.

In box 415, the reaction detection application 254 can transmit media segments of the reaction events 218 to a reaction classification service 221 (FIG. 2). In some embodiments, the client device 206 may not have the computing capability to analyze the video and audio segments for determining the reaction classification 233 of the reaction events 218. The reaction classification service 221 can comprise machine learning functionality for determining the reaction classification 233. The reaction detection application 254 can transmit video segments of motion events 227 and audio segments of audio events 230 as inputs to the reaction classification service 221. With regard to the video segments, the reaction classification service 221 can identify participant movements, such as facial movements and/or body part movements of the participant 103, in one or more video frames. The reaction classification service 221 can map the participant movement to a reaction classification 233. The mapping can involve comparing the participant movement to a set of model expressions 225 (FIG. 2) for each reaction classification 233. The model expression 225 may be embodied as parameters extracted from one or more video frames. For example, the participant movements can be compared to a set of model expressions 225 representative of various variations of a frightened expression.

With regard to the audio segment, the reaction classification service 221 can identify an audio profile of the audio segment. The reaction classification service 221 can map the audio profile to a reaction classification 233. The mapping can involve comparing the audio profile to a set of model expressions 225 for each reaction classification 233. The model expression 225 may be embodied as an example audio segment of one variation of a particular audible expression. For example, the audio profile can be compared to a set of model expressions 225 representative of various variations of an audible frightened expression, such as a gasp, a scream, and other suitable audible frightened expressions.

In box 418, the reaction detection application 254 can receive a reaction classification 233 for the reaction events 218. In other embodiments, the reaction detection application 254 can determine a reaction classification 233 for the reaction events 218 within the client device 206.

In box 421, the reaction detection application 254 can associate the reaction classification 233 with the point in time in the media item 106. For example, the reaction detection application 254 can associate a laughing reaction at the 35 minutes and 10 seconds mark of a media item 106. Thereafter, the operation of the portion of the reaction detection application 254 can proceed to the end.

Figure 5:
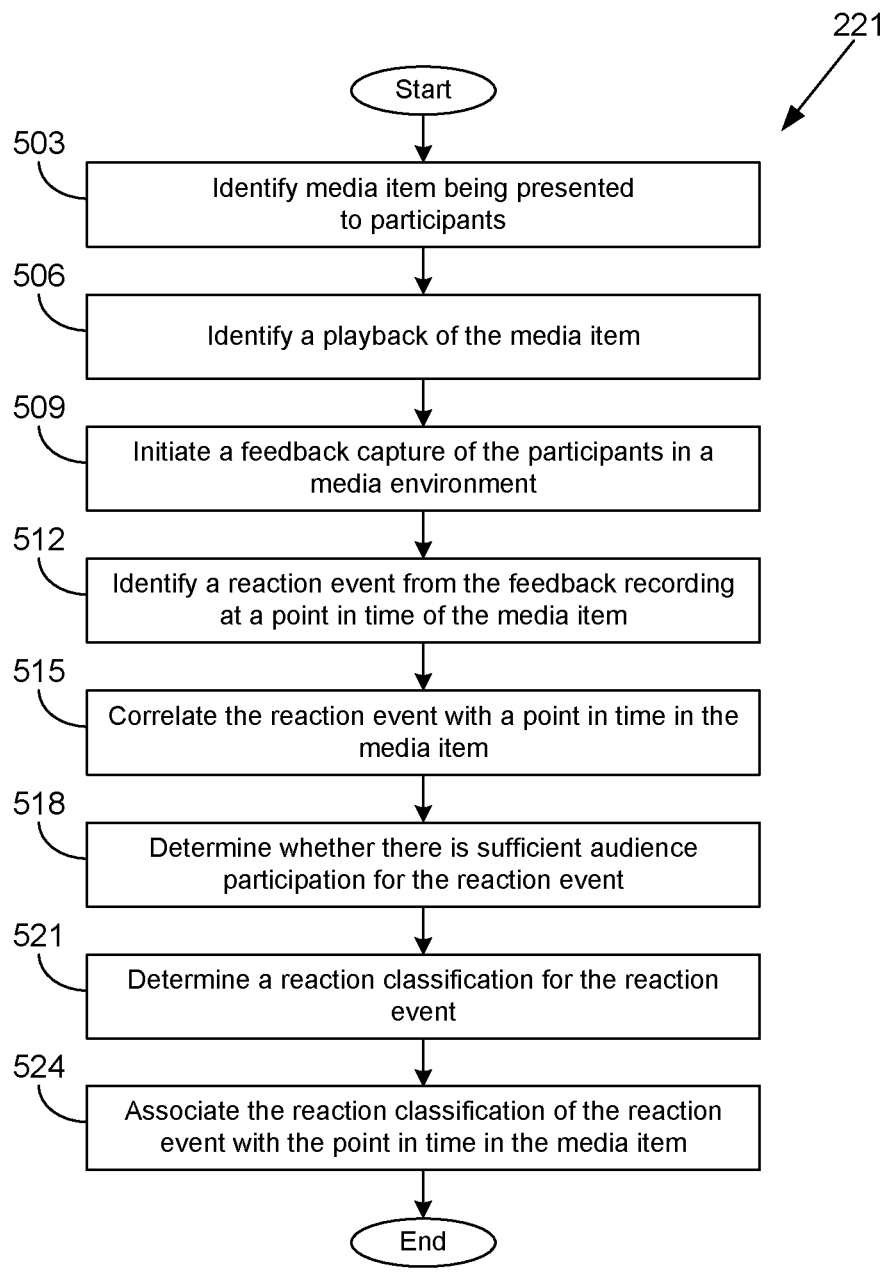
FIG. 5 is a flowchart illustrating examples of functionality implemented as portions of a reaction classification service executed in a computing device in the networked environment of FIG. 2 according to various embodiments of the present disclosure.

Referring next to FIG. 5, shown is a flowchart that provides one example of the operation of a portion of the reaction classification service 221 according to various embodiments. It is understood that the flowchart of FIG. 5 provides merely an example of the many different types of functional arrangements that may be employed to implement the operation of the portion of the reaction classification service 221 as described herein. As an alternative, the flowchart of FIG. 5 may be viewed as depicting an example of elements of a method implemented in the computing environment 203 (FIG. 2) according to one or more embodiments.

Beginning with box 503, the reaction classification service 221 can identify a media item 106 being presented to participants 103 (FIG. 1) in a media environment 100 (FIG. 1). The reaction classification service 221 can receive an indication of a particular media item 106 (FIG. 1) about to be presented from the front-end media player 251 (FIG. 2) or from the media player service 217 (FIG. 2). In some embodiments, the reaction classification service 221 can identify a change in the media item 106 being presented. For example, the reaction classification service 221 can receive an indication that a first media item 106 has ended and a second media item 106 will be presented next. For instance, the reclassification classification service 221 can distinguish different movie trailers being presented from the feature presentation of movie in the movie theater.

In box 506, the reaction classification service 221 can identify a playback of the media item 106. In some embodiments, the reaction classification service 221 can receive an indication for playback from the front-end media player 251 or from the media player service 217. Continuing from the previous example, the reaction classification service 221 can also identify which of several media items 106 is currently being presented.

In box 509, the reaction classification service 221 can cause a feedback capture of the participants 103 to begin. In some embodiments, the reaction classification service 221 can transmit a capturing instruction to cameras 109 (FIG. 1), microphones 112 (FIG. 1), and media devices with cameras 109 and/or microphones 112 via the network 209 (FIG. 2). In other embodiments, the reaction detection application 254 (FIG. 2) can relay or initiate instructions that cause the cameras 109 and microphones 112 to begin recording. The cameras 109 and the microphones 112 can transmit the video and audio recordings to the reaction classification service 221.

In box 512, the reaction classification service 221 can identify reaction events 218 (FIG. 2) from the feedback recording (e.g. video and/or audio recordings) at a point in time of the media item 106. In some embodiments, the reaction detection application 254 can identify the reaction events 218. The reaction detection application 254 can extract the video and audio segments of the reaction events 218 and transmit them to the reaction classification service 221.

In box 515, the reaction classification service 221 can correlate the reaction events 218 with points in time in the media item 106. In some embodiments, the reaction events 218 may comprise a time stamp. In other embodiments, the reaction classification service 221 can determine a point in time in the media item 106 associated with the reaction events 218 by identifying an audio signal of the media item 106 captured with the reaction event 218. From the audio signal, the reaction classification service 221 can determine a point in time of the media item 106.

In box 518, the reaction classification service 221 can determine whether there is sufficient audience participation for the reaction event 218. The reaction classification service 221 can determine a quantity of participants 103 that caused a reaction event 218. The reaction classification service 221 can determine whether the quantity exceeds a threshold.

In box 521, the reaction classification service 221 can determine a reaction classification 233 (FIG. 2) for the reaction event 218. The reaction classification service 221 can compare the motion events 227 (FIG. 2) and/or the audio events 230 (FIG. 2) with a plurality of model expressions 225 (FIG. 2). With regard to the motion events 227, the comparison can involve comparing a first sequence of movements by a participant 103 depicted in multiple images with a second sequence of movements in individual model expressions 225. With regard to the audio events 230, the reaction classification service 221 can compare a first audio profile from the audio event 230 with a second audio profile of individual model expressions 225.

In some embodiments, the reaction classification service 221 can consider other sensor data 229. For example, the reaction detection application 254 can transmit sensor data 229 captured from the seats 115 (FIG. 1). The seats 115 can comprise motion sensors, weight sensors, and other suitable sensors. The seats 115 can use one or more sensors to capture reactionary movements of the participant 103 during the playback of a media item 106. For instance, the motion sensors can be used to capture jumps, sudden movements, or other reactionary movements during the media item 106. The sensor data can be correlated to a point in time in the media item 106 and used to determine reaction classification 233. For example, detected sudden movements by a plurality of participants 103 can be used to determine that the participant 103 was frightened at the 10 minute and 23 seconds mark of the media item 106.

In box 524, the reaction classification service 221 can associate the reaction classification 233 of the reaction event 218 with the point in time in the media item 106. Thereafter, the operation of the portion of reaction classification service 221 can proceed to the end.

Figure 6:
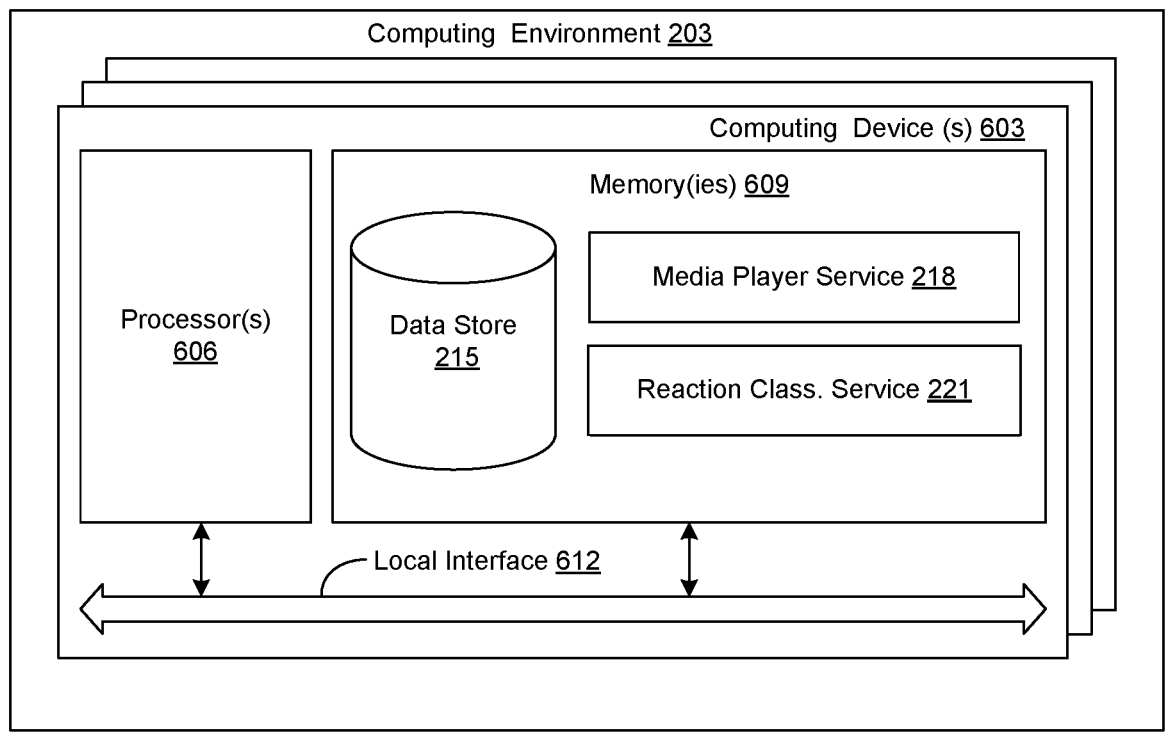
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 603. Each computing device 603 includes at least one processor circuit, for example, having a processor 606 and a memory 609, both of which are coupled to a local interface 612. To this end, each computing device 603 may comprise, for example, at least one server computer or like device. The local interface 612 may comprise, for example, a data bus with an accompanying address/control bus or other bus structure as can be appreciated.

Stored in the memory 609 are both data and several components that are executable by the processor 606. In particular, stored in the memory 609 and executable by the processor 606 are media player service 217, the reaction classification service 221, and potentially other applications. Also stored in the memory 609 may be a data store 215 and other data. In addition, an operating system may be stored in the memory 609 and executable by the processor 606.

It is understood that there may be other applications that are stored in the memory 609 and are executable by the processor 606 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 609 and are executable by the processor 606. In this respect, the term "executable" means a program file that is in a form that can ultimately be run by the processor 606. Examples of executable programs may be, for example, a compiled program that can be translated into machine code in a format that can be loaded into a random access portion of the memory 609 and run by the processor 606, source code that may be expressed in proper format such as object code that is capable of being loaded into a random access portion of the memory 609 and executed by the processor 606, or source code that may be interpreted by another executable program to generate instructions in a random access portion of the memory 609 to be executed by the processor 606, etc. An executable program may be stored in any portion or component of the memory 609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 609 is defined herein as including both volatile and nonvolatile memory and data storage components. Volatile components are those that do not retain data values upon loss of power. Nonvolatile components are those that retain data upon a loss of power. Thus, the memory 609 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 606 may represent multiple processors 606 and/or multiple processor cores and the memory 609 may represent multiple memories 609 that operate in parallel processing circuits, respectively. In such a case, the local interface 612 may be an appropriate network that facilitates communication between any two of the multiple processors 606, between any processor 606 and any of the memories 609, or between any two of the memories 609, etc. The local interface 612 may comprise additional systems designed to coordinate this communication, including, for example, performing load balancing. The processor 606 may be of electrical or of some other available construction.

Although media player service 217, the reaction classification service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the reaction detection application 254 and the reaction classification service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 606 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the reaction detection application 254, the media player service 217, and the reaction classification service 221, that comprises software or code can be embodied in any non-transitory computer-readable medium for use by or in connection with an instruction execution system such as, for example, a processor 606 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the reaction detection application 254, the media player service 217, and the reaction classification service 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 603, or in multiple computing devices 603 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed, causes the at least one computing device to at least:
   identify a playback of a media item in a media environment for a plurality of participants;
   identify in a video signal a plurality of motion events individually associated with the plurality of participants viewing the media item, the video signal being captured by an image capture device associated with the media environment, the plurality of motion events being associated with a point in time of the media item, the plurality of motion events occurring within a time period from the point in time;
   determine that a quantity of the plurality of participants causing a subset of the plurality of motion events meets a threshold number of participants in the media environment, the subset of the plurality of motion events having a respective time stamp captured within a time threshold from the point in time of the playback of the media item;
   determine a reaction classification based at least in part on a comparison between the plurality of motion events and a sequence of transitions for a plurality of reference points for a model expression, wherein the plurality of reference points comprises at least one of a facial reference point or a body reference point; and
   associate the reaction classification with the point in time of the media item.

2. The non-transitory computer-readable medium of claim 1, wherein the program, when executed, further causes the at least one computing device to at least:
   identify a plurality of audio events that correspond with the plurality of motion events, the plurality of audio events being identified from an audio recording of the plurality of participants, wherein the plurality of audio events further comprises filtering out an audio signal of the media item, the plurality of audio events being associated with the point in time of the media item, wherein the audio recording is captured by an audio capturing device positioned in the media environment.

3. A system, comprising:
   at least one computing device; and
   an application executable in the at least one computing device, wherein the application, when executed, causes the at least one computing device to at least:
     identify a plurality of reaction events from sensor data generated by at least one participant consuming a playback of a media item;
     correlate the plurality of reaction events with a point in time of the media item;
     determine a reaction classification for the plurality of reaction events based at last in part on a comparison between the plurality of reaction events and a sequence of transitions for a plurality of reference points for a model expression; and
     associate the reaction classification with the point in time of the media item.

4. The system of claim 3, wherein the sensor data comprises a first audio recording from a first media device and a second audio recording from a second media device, and the identification of the plurality of reaction events of the at least one participant is further based at least in part on the first audio recording and the second audio recording.

5. The system of claim 3, wherein the media item comprises a first video, the plurality of reaction events comprises a first reaction event and a second reaction event, the reaction classification comprises a first reaction classification and a second reaction classification, and the application, when executed, causes the at least one computing device to at least:
- identify a change in playback from the first video to a playback of a second video;
- identify the second reaction event from the sensor data generated by the at least one participant consuming the playback of the second video;
- correlate the second reaction event with a respective point in time of the second video; and
- determine the second reaction classification for the second reaction event based at last in part on the sensor data, wherein the second reaction classification is associated with the second video.

6. The system of claim 3, wherein the sensor data is received over a network from a wearable computing device, the sensor data comprises at least one of: heart rate data associated with the at least one participant or motion data associated with the at least one participant.

7. The system of claim 3, wherein the at least one participant comprises a first participant and a second participant, and the identification of the plurality of reaction events further comprises identifying a first portion of the plurality of reaction events as being associated with the first participant and a second portion of the plurality of reaction events as being associated with the second participant.

8. The system of claim 3, wherein the reaction classification comprises at least one of: a laughing expression, a tearful expression, a frightened expression, or an excited expression.

9. The system of claim 3, further comprising an image capturing device, and the application, when executed, causing the at least one computing device to at least identify, using the image capturing device, that the at least one participant has left a defined viewing area for the playback of the media item.

10. The system of claim 9, wherein the application, when executed, causes the at least one computing device to at least:
- cause the playback of the media item to pause in response to the identification of the at least one participant leaving the defined viewing area; and
- resume the playback of the media item in response to identifying that the at least one participant is located within the defined viewing area.

11. The system of claim 3, wherein the application, when executed, causes the at least one computing device to at least:
- identify a pause command for the playback of the media item; and
- transmit a pause recording command to at least one of a plurality of media devices controlling an audio capture device or an image capture device.

12. A method, comprising:
- identifying, via at least one computing device, in a video signal from a plurality of reaction events individually associated with a plurality of participants viewing a playback of a media item, the video signal being captured by an image capture device;
- correlating, via the at least one computing device, the plurality of reaction events with a point in time of the media item based at least in part on an audio signal of the media item;
- determining, via the at least one computing device, a reaction classification for the plurality of reaction events based at least in part on a comparison between a video segment of the plurality of reaction events and a sequence of transitions for a plurality of reference points for a model expression, wherein the plurality of reference points comprises at least one of a facial reference point or a body reference point; and
- associating, via the at least one computing device, the reaction classification with the point in time of the media item.

13. The method of claim 12, wherein identifying the video signal from the plurality of reaction events is based at least in part on an audio recording of the plurality of participants in a media environment, wherein the audio recording is captured by a plurality of audio capturing devices individually positioned at a plurality of locations in the media environment.

14. The method of claim 13, further comprising: determining, via the at least one computing device, a reaction strength indicator for a location within the media environment based at least in part on a portion of the audio recording being recorded by one of the plurality of audio capturing devices within a proximity of the location, wherein the reaction strength indicator is expressed as a quantity from a range of values for the reaction classification.

15. The method of claim 13, wherein the audio recording is captured by a beamforming microphone, and the beamforming microphone is used to associate a subset of the plurality of reaction events to a respective participant among the plurality of participants in the media environment.

16. The method of claim 12, wherein the point in time comprises a first point in time, and wherein identifying in the video signal the plurality of reaction events individually associated with the plurality of participants viewing the media item further comprises:
- identifying, via the at least one computing device, in the video signal an initial viewing posture of the plurality of participants; and
- identifying, via the at least one computing device, a second point in time in which a quantity of the plurality of participants have changed from the initial viewing posture, wherein the quantity exceeds a threshold.

17. The method of claim of 12, wherein the video signal is captured by at least one of: a thermal image camera, a point-cloud camera, or a three-dimensional scanner, and wherein identifying in the video signal the plurality of reaction events is based at least in part on a limb movement of at least one of the plurality of participants in the video signal.

18. The method of claim 12, wherein the video signal comprises a facial expression state for the plurality of participants, and identifying in the video signal the plurality of reaction events individually associated with the plurality of participants viewing the playback of the media item is based at least in part on a change in the facial expression state for at least one of the plurality of participants in the video signal.

19. The method of claim 12, wherein the model expression comprises a first model express, and further comprising determining, via the at least one computing device, a reaction strength indicator for the reaction classification based at least in part on a comparison between the plurality of reaction events and a second model expression representative of a particular strength indication for a particular reaction.

20. The method of claim 19, wherein comparing the plurality of reaction events with the second model expression is further based at least in part on comparing the model expression to a combination of an audible reaction and a visual movement of the plurality of reaction events.

\* \* \* \* \*